United States Patent [19]

Huber

[11] 4,110,557
[45] Aug. 29, 1978

[54] PHASE LOCK OSCILLATOR FOR USE IN DATA PROCESSING SYSTEM

[75] Inventor: W. Donald Huber, San Jose, Calif.

[73] Assignee: Sperry Rand Corporation, New York, N.Y.

[21] Appl. No.: 754,849

[22] Filed: Dec. 27, 1976

[51] Int. Cl.² .............................................. H04L 7/02
[52] U.S. Cl. ..................................... 178/69.1; 178/88; 328/120
[58] Field of Search ................ 178/69.1, 88; 325/320, 325/321, 322; 360/39, 51; 328/99, 120; 331/17, 25; 329/50, 104, 105

[56] References Cited

U.S. PATENT DOCUMENTS

| 3,652,943 | 3/1972 | Piccirilli | 328/120 |
| 3,810,234 | 5/1974 | Monett | 360/51 |
| 3,838,214 | 9/1974 | Lind | 178/69.1 |
| 3,900,890 | 8/1975 | Eibner | 360/51 |
| 3,921,076 | 11/1975 | Currie | 178/69.1 |
| 3,922,613 | 11/1975 | Allen | 328/120 |

Primary Examiner—John C. Martin
Assistant Examiner—Michael A. Masinick
Attorney, Agent, or Firm—Gerald L. Moore

[57] ABSTRACT

A phase lock oscillator system employing a phase and frequency detector which receives the data pulses and the clocking signal modulated to include only the clocking pulses corresponding in timed sequence to the actual data pulses for generating an error signal to regulate the voltage controlled oscillator.

7 Claims, 4 Drawing Figures

PHASE LOCK OSCILLATOR FOR USE IN DATA PROCESSING SYSTEM

BACKGROUND OF THE INVENTION

In data systems used with computers the data is recorded in digital form and a clocking signal is utilized to synchronize the record and playback process. On playback the clocking signal of a frequency corresponding to the data must be generated once again. This clocking signal is used to sequence the data processing.

In the usual data recording system there is recorded a series of signals at the beginning of a data location called a preamble. The purpose for the preamble is to enable a clocking circuit to synchronize in phase and frequency with the recorded data. Such synchronization however must continue during the actual data readback operation of the system because the frequency of the data can change. Reasons for such change can involve such factors as a change in velocity of the recording media such as a rotating disc and others.

In past systems the synchronization of data and clocking signal has been accomplished by use of a phase and frequency detector to which is fed the data signal being read back and the clocking signal from an oscillator. Thus clocking pulses are received continuously and each time a data pulse is encountered it is compared with the next adjacent clocking pulse for the generation of an error signal for readjustment of the phase and frequency of the clocking signal generator. The clocking signal generator is usually a voltage controlled oscillator adjustable in phase and frequency in response to an error signal.

Since the phase and frequency detector in past systems has received the data signal and all clocking pulses from the oscillator, care must be taken to assure that the data pulses are compared with the correct clocking pulse in timed sequence. For instance if the data signal is compared with the next adjacent clocking pulse erroneously, an incorrect error signal will be generated which in turn will incorrectly adjust the phase and/or frequency of the oscillator.

Noise in the data signal, pulse crowding and other factors can result in data pulse shifting. Thus to assure that the clocking pulse is compared only with the correctly correlated data pulse, the time domain, i.e. that time period or window during which the data pulse must occur, must be small. Otherwise pulse shifting can result in the data pulse occurring within the time domain of the next adjacent clocking pulse. However this reduction of the time domain also reduces the capability of the phase lock system to recover phase and frequency locking with the data signal.

In advanced run bounded self-clocking coding systems, the recorded pulses can be further apart at times and still be interpreted as data. Thus there is greater opportunity to broaden the time domain of the phase and frequency detector. However in presently used systems, this opportunity is not utilized.

Also for purposes of fast recovery or synchronization of the phase and frequency, it is desirable that the feedback loop be of a wide bandwidth. Thus a larger error signal is generated for a discrepancy in phase or frequency between the data and the clocking signal thereby permitting adjustment at a faster rate. However the wider bandwidth also makes the system more susceptible to noise and other momentary disruptions in the data signal. In addition the clocking signal will frequently be a frequency which is a harmonic of the frequency of the data bits thereby requiring that the phase and frequency detector be of the harmonic type. With the wide bandwidth harmonic frequency and phase detector, there always exists the possibility that the phase lock loop will lock onto an improper harmonic of the actual data frequency.

Thus one approach in the past has been to utilize a two mode phase detector operable in a nonharmonic mode during the preamble phase of operation and in a harmonic mode during data readback to accommodate missing bits, et cetera. However during data readback such an operation necessitates a narrow bandwidth phase lock loop to lessen the possibility that the system will once again synchronize to an erroneous phase or frequency even though such operation slows the recovery time for the system.

It is the purpose of the present invention to provide an improved phase lock oscillator system for generating a clocking signal in a data recording system or in communications systems.

SUMMARY OF THE INVENTION

A system for generating a clocking signal responsive in phase and frequency to a data signal being read back comprising a voltage controlled oscillator regulated by an error signal generated by a phase and frequency detector. The detector receives the data signal and a modulated clocking signal having those clocking pulses eliminated that do not correspond to individual data pulses for generating the error signal. Thus the system functions to correlate the clocking and data signals in a broader time domain for the generation of a more accurate and responsive error signal for synchronizing such signals.

DESCRIPTION OF THE INVENTION

Figure 1:
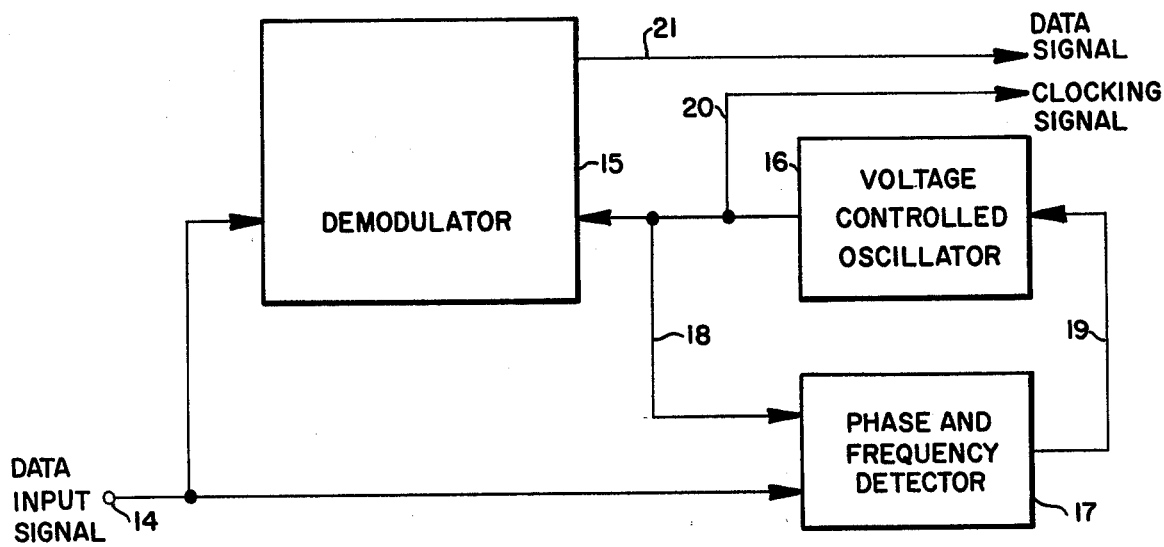
FIG. 1 is a block diagram of the prior art clocking signal generating circuit.

In FIG. 1 is shown a prior art system for generating a clocking signal during the reading back of a data signal from a recording device (not shown). Thus the data input signal is fed to a demodulator 15 which also receives a clocking signal from the voltage controlled oscillator 16. Thus the demodulator represents the first step in decoding and processing the data signal.

The data input signal is also fed to a phase and frequency detector 17 which compares the incoming data signal with the output signal from the voltage controlled oscillator received through the conductor 18. The detector generates an error signal which is fed through the conductor 19 to the voltage controlled oscillator to readjust the phase and frequency of the oscillator output signal, i.e. the clocking signal, to synchronize with that of the data signal. Thus in such previous embodiments the phase and frequency detector receives each pulse of the clocking signal and compares this signal with a data signal in time sequence to generate an error signal if the phase or frequency of the clocking pulse varies from that of a corresponding data signal pulse. Thus a synchronized clocking signal is supplied at the terminal 20 and the data signal is transmitted through the terminal 21 for use in a data processing system. A more complete description of a phase detector of this type can be obtained by reference to the copending U.S. patent application Ser. No. 647,594, now U.S. Pat. No. 4,001,611, Jan. 8, 1976 and entitled: Two Mode Harmonic and Nonharmonic Phase Detector. This copending application is also assigned to the Sperry Rand Corporation.

In the usual system as described in this previously filed application, there is recorded a preamble preceding the recorded data on a recording media such as a disc utilized in a disc recording system. In normal operation, as for instance in the above-identified copending application, the frequency and phase detector is set for wideband nonharmonic operation during the lock-on phase of the reading of the preamble and thereafter switched to a more narrow band harmonic mode during the reading of data. In addition during data readback the time domain for the data pulses must be short to guard against comparing the data pulse with an incorrectly timed clocking pulse. However the switching to the narrow band lengthens the reaction time to any changes in frequency or phase of the data thereby increasing the possibility of erroneous decoding of the data. Also the shorter time domain for the data pulses diminishes the capabilities of the detector in correcting the phase and frequency of the clocking signal.

In the instance of run bounded codes such as MFM, $M^2FM$ and 3 PM coding, both the presence and absence of pulses can be interpreted as data. As a result, there can be longer periods of time between pulses thereby making it more imperative that the clocking signal be adjusted accurately and more quickly on the occurrence of a succeeding pulse following one of these longer periods of the absence of pulses because the clocking signal can be further out of synchronization with the data signal. Thus the switching to a narrow band operation can cause additional problems in the decoding of the data leading to a misinterpretation or misreading of the data within the system. For instance in MFM recording, the pulses can be as close as two spaces or detents and as far apart as four detents maximum while with $M^2FM$ the pulses can be spaced a minimum of two and a maximum of five positions. Three PM recording is disclosed in the copending application assigned to Sperry Rand, Ser. No. 705,199 filed July 14, 1976, and entitled Method and Apparatus for Encoding and Recovering Binary Digital Data. In this encoding method the pulses can be as close as three detents and spaced apart as much as 12 detents. Thus while advantages are gained in the use of the latter code, more stringent requirements are placed on the clocking signal generator system because of the longer periods during which there can be an absence of data pulses.

Thus in previous systems the clocking signal from the oscillator was supplied to the phase and frequency detector. Each of these clocking pulses compared with one detent of the data code. If, within a predetermined time domain of plus or minus no more than one half detent, a data pulse occurs, the phase and frequency of the pulses are compared for the generation of an error signal for correcting the phase and frequency of the clocking signal generator, if needed. The narrow time domain was necessary to assure that the data pulse was compared with the properly sequenced clocking pulse.

However as just described, presently used codes have as a primary objective the spreading of the pulses or transitions of the recorded signal to allow higher density recording. It is the purpose of the present invention to make accommodation for this pulse spreading in presently used codes to generate a more accurate clocking signal.

Figure 2:
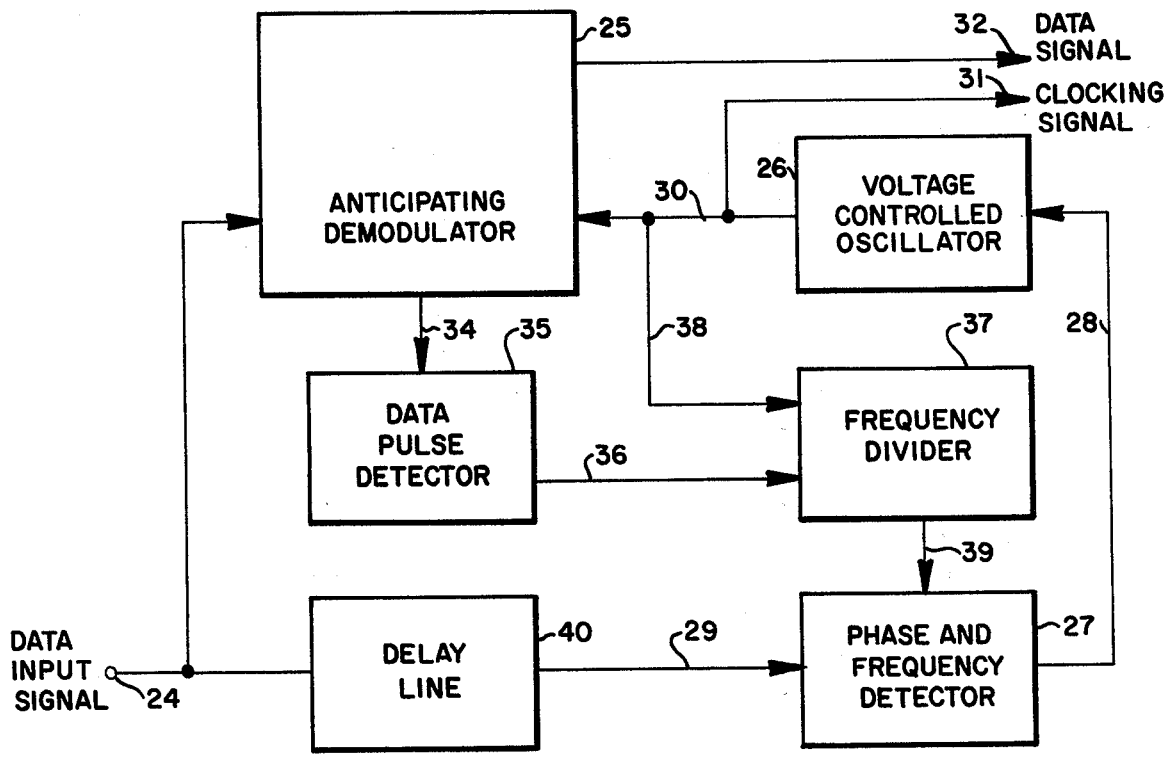
FIG. 2 is a block diagram of the present invention.

In accordance with the present invention, there is provided a clock recovery system for a data recording system having improved capabilities of synchronizing in phase and frequency the clocking signal with the data signal in the presence of noise. Accordingly as shown in FIG. 2 the data input signal is fed to the terminal 24 for transmission to an anticipating demodulator 25. In the manner of the prior art previously described, there is provided a voltage controlled oscillator 26 which receives a control or error signal from the phase and frequency detector 27 transmitted through a conductor 28, which error signal is generated as a result of receiving the delayed data input signal through the conductor 29. This recovered clocking signal from the oscillator 26 is supplied to the demodulator 25 through the conductor 30 and is also supplied to the terminal 31 just as the data signal is supplied to the terminal 32.

The demodulator 25 serves to receive the data signal and transfer it to the data pulse detector 35 which provides a signal responsive to the spacing between each of the consecutive data pulses. This signal is transmitted through the conductor 36 to the frequency divider 37 which in turn allows transmission of only those clocking pulses corresponding to an actual data pulse and prevents the transmission of clocking pulses received through the conductor 38 that do not correspond to data pulses. In other words, the frequency divider acting in response to a signal derived from the data pulses of the data signal divides the frequency signal such that the clocking pulses fed to the phase and frequency detector 27 correspond with actual data pulses in the data signal. A delay line 40 included in the input signal circuit assures that the data signal received by the phase and frequency detector will be in synchronism with the clocking signal received from the frequency divider 37. The delay line is necessary to permit sufficient time for the data pulse detector to determine the proper control signal for the frequency divider. One example of a circuit suitable for use as the frequency divider 37 is the Fairchild Binary Counter 9316.

Figure 3:
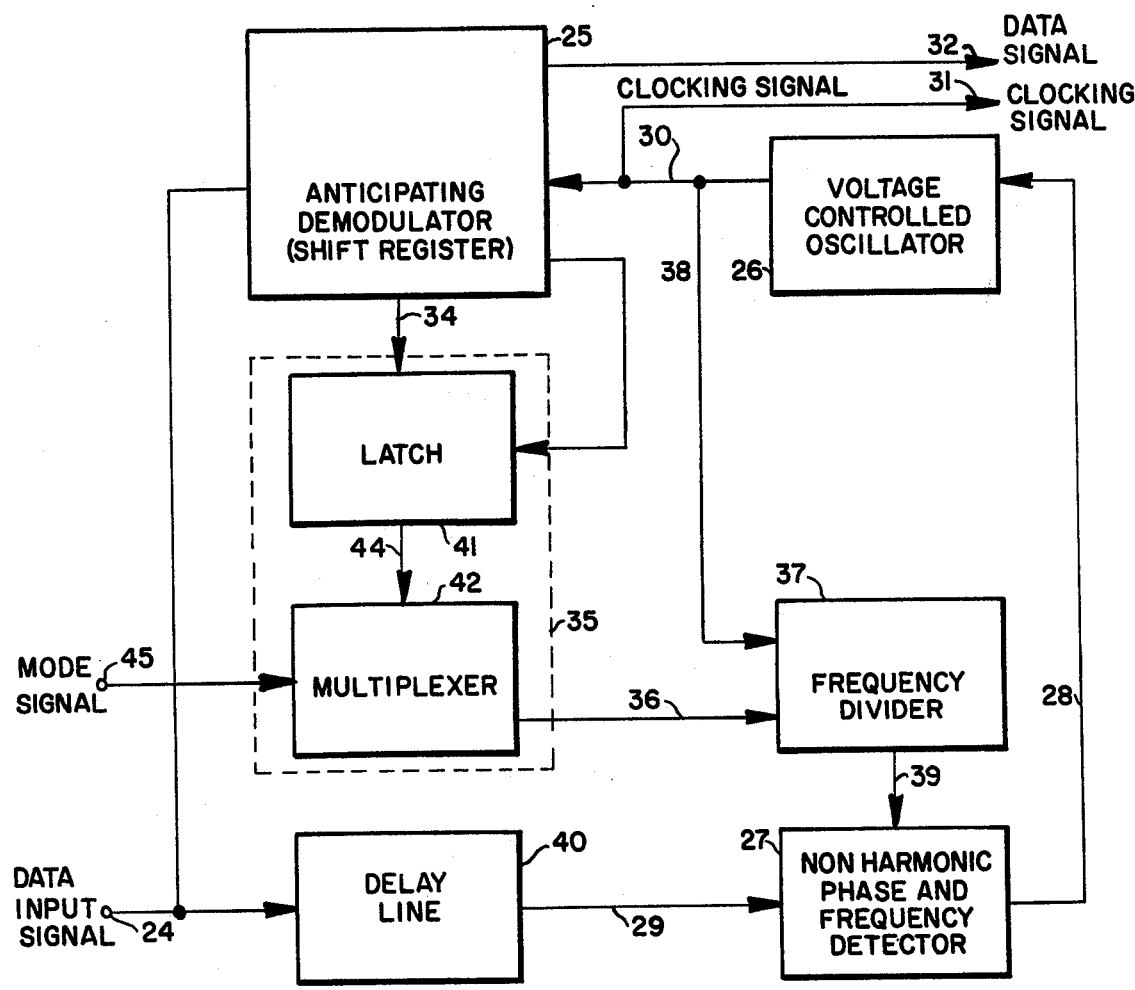
FIGS. 3 and 4 are block diagrams of the circuit of FIG. 2 in more detail.

In FIG. 3 is shown a more detailed block diagram of a particular embodiment of the invention wherein the components corresponding to those shown in FIG. 2 have the same numeral identification. As shown the input signal is received at the terminal 24 and is supplied through a delay line 40 to the phase and frequency detector 27. The data signal is also supplied to the demodulator or shift register 25 which also receives the clocking signal from the voltage controlled oscillator 26. The demodulator supplies the data signal through the conductor 34 to the data pulse detector 35 which includes a latch 41 and a multiplexer 42. The latch serves to sense the spacing between each two juxtapositioned data pulses and transmit this information through the conductor 42 to the multiplexer. The multiplexer in turn feeds a signal to the frequency divider corresponding to this spacing which signal enables the frequency divider to divide the clocking signal received through the conductor 38 appropriately to delete those clocking pulses not corresponding to actual data pulses. Thus the remaining clocking pulses are fed through the conductor 39 to the detector 27 for the generation of an error signal to readjust the frequency or phase of the clocking signal by adjustment of the voltage controlled oscillator 26. As will be explained in more detail later, a mode signal is also received by the multiplexer 42 through the terminal 45. The purpose of this mode signal is to first set the multiplexer to generate a predetermined frequency divider signal corresponding to the frequency of the preamble signal. Thus the frequency divider supplies a signal of predetermined frequency to the phase and frequency detector during the initial stage of reading data for synchronizing the clocking signal pulses with the data preamble pulses. Thereafter by changing the mode of the multiplexer 42 by a signal at the terminal 45, the divider signal supplied to the frequency divider 37 is set in accordance with the actual data pulses being read.

Figure 4:
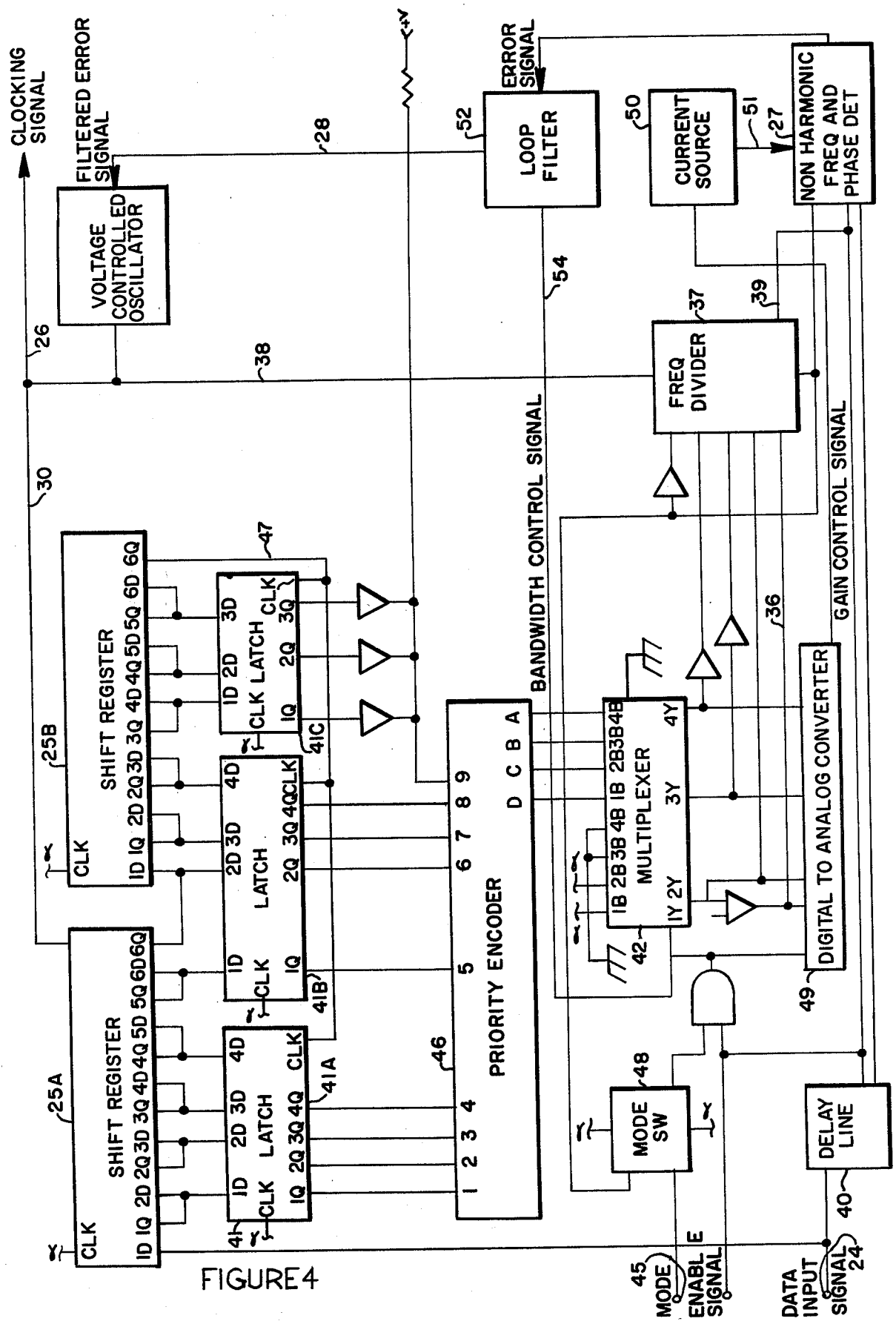

Shown in FIG. 4 is a specific embodiment of the invention for use with 3 PM coding identified heretofore. This system is devised to operate with this coding wherein the data pulses can be as little as three spaces apart or as much as twelve spaces maximum. Specific examples of the components suitable for use in this circuit and made by the Texas Instrument Company are listed below:

| Shift Register 25 | TI S174 |
|---|---|
| Latches 41 | TI S175 |
| Priority Encoder 46 | TI 147 |
| Mode Switch 48 | TI S74 |

As shown in FIG. 4 the data input signal is received at the terminal 24 and fed to the shift registers 25A and 25B. When the first pulse is received at the last terminal of the shift register 25B, the latches 41A, 41B and 41C are triggered by a signal received through the conductor 47 to supply signals to a priority encoder 46 corresponding to the positions of the pulses detected by the latches. The priority encoder then supplies through the plurality of conductors a binary signal corresponding to the spaces between pulses. This binary signal passes through the multiplexer 42 to supply through the multiple conductors 36 a control signal to the frequency divider 37. This control signal thereafter causes the frequency divider to prevent transmission of those clocking pulses not corresponding to actual data pulses to the frequency and phase detector 27. The frequency and phase detector simultaneously receives from the delay line 40 the data input signal for comparison with the processed clocking signal to generate an error signal which is conducted through the conductor 28 to the voltage controlled oscillator. Thus in the same manner as previously described. the clocking pulses are fed to the phase and frequency detector for the generation of the error signal.

The mode signal supplied to the terminal 45 sets the mode switch 48 to signal the multiplexer 42 that a predetermined divider signal be supplied to the frequency divider 37. Following transmission of the preamble signal, the mode switch is set to cause the multiplexer to transmit the priority encoder signal corresponding to the data spaces between data pulses to the same divider. In addition depending upon the signal received by the multiplexer, there is supplied through the digital-to-analog converter 49 a signal for adjusting the gain of a current source 50 such that the overall gain of the loop is maintained constant regardless of the spacing of the data pulses. The current source supplies current to the detector 27 through the conductor 51. In addition a loop filter 52 acting in response to the signal from the multiplexer indicating the frequency of the data signal is provided to vary the magnitude of the error signal supplied to the oscillator 26 thereby regulating the bandwidth of the circuit. The mode signal for setting the mode switch 48 is commonly generated in such data processing systems.

Thus as can be seen, the present circuit senses the spacing between adjacent data pulses, such spaces being determined in sequence with the clocking signal for supplying to the frequency and phase detector those clocking pulses corresponding to the data pulses of the data signal. Thus the spacing between data and clocking pulses received by the phase and frequency detector is greater than if every clocking pulse was received. For this reason the dynamic range of the phase error can be increased while constant loop gain is maintained so that the signal-to-noise ratio of the recovered clock is greater than was obtainable in prior art systems.

The invention claimed is:

1. A system for generating clocking signal responsive in phase and frequency to a data signal having intermittent pulses indicating data, said system comprising:
   an oscillator for providing a clocking signal responsive in frequency and phase to an error signal;
   a phase and frequency detector for receiving and comparing the data signal pulses to said clocking signal for generating an error signal for regulating the oscillator so the phase and frequency of the clocking signal equals that of the data signal; and
   means to prevent the transmission of the clocking signal to the phase and frequency detector when no data pulse exists in the data signal.

2. A system for generating a clocking signal as defined in claim 1 wherein said means to prevent the transmission of the clocking signal includes a demodulator receiving said data signal, in combination with means for generating a signal responsive to the occurrence of pulses in the data signal.

3. A system for generating a clocking signal as defined in claim 2 including a frequency divider connected to receive the clocking signal from the oscillator and divide said clocking signal responsive to the signal responsive to the occurrence of data pulses before transmission of the clocking signal to the phase and frequency detector.

4. A system for generating a clocking signal as defined in claim 3 including means to delay transmission of the data signal to the phase and frequency detector to synchronize the data signal with the clocking signal received from the frequency divider.

5. A system for generating a clocking signal as defined in claim 4 including means for generating a gain control signal responsive to the data signal, and means to regulate the gain of the system responsive to the gain control signal.

6. A system for generating a clocking signal responsive in phase and frequency to a data signal having intermittent pulses indicating data, said system comprising in combination:
   a voltage controlled oscillator for providing a clocking signal responsive in phase and frequency to an error signal;
   a frequency divider for receiving and dividing said clocking signal responsive to a frequency control signal;
   a shift register receiving said data signal;
   circuit means for transmitting said clocking signal to the shift register sequencing said register;

means to generate said frequency control signal for regulating said frequency divider responsive to the occurrence of data signal pulses in the shift register; and a phase and frequency detector receiving said divided clocking signal from the frequency divider and the data signal for generating the error signal for regulating the voltage controlled oscillator.

7. A system for generating a clocking signal as defined in claim 6 including means to delay transmission of the data signal to the phase and frequency detector to synchronize the arrival of the data signal in the detector with the divided clocking signal received from the frequency divider.

* * * * *